United States Patent
Yamamoto et al.

(10) Patent No.: US 11,518,306 B2
(45) Date of Patent: Dec. 6, 2022

(54) WARNING CONTROL DEVICE, WARNING CONTROL METHOD, AND COMPUTER PROGRAM PRODUCT

(71) Applicant: Panasonic Intellectual Property Management Co., Ltd., Osaka (JP)

(72) Inventors: Shuya Yamamoto, Osaka Fu (JP); Kenichi Yadani, Kyoto Fu (JP); Yoshiteru Kawasaki, Osaka Fu (JP); Eiji Irie, Osaka Fu (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 146 days.

(21) Appl. No.: 17/108,317

(22) Filed: Dec. 1, 2020

(65) Prior Publication Data

US 2021/0188166 A1 Jun. 24, 2021

(30) Foreign Application Priority Data

Dec. 24, 2019 (JP) .............................. JP2019-233447

(51) Int. Cl.
*B60Q 9/00* (2006.01)
*G06T 7/20* (2017.01)
*G01S 13/58* (2006.01)

(52) U.S. Cl.
CPC ............ *B60Q 9/008* (2013.01); *G01S 13/588* (2013.01); *G06T 7/20* (2013.01); *G06T 2207/30252* (2013.01)

(58) Field of Classification Search
CPC ..... B60Q 9/008; G01S 13/588; G01S 13/931; G06T 7/20; G06T 2207/30252; G06V 20/56
See application file for complete search history.

(56) References Cited

U.S. PATENT DOCUMENTS

| | | | |
|---|---|---|---|
| 10,406,977 B2 | 9/2019 | Yoshitomi et al. | |
| 2004/0176936 A1* | 9/2004 | Ohtsu | G09B 19/167 703/8 |
| 2008/0162027 A1* | 7/2008 | Murphy | G05D 1/0274 701/1 |
| 2012/0083964 A1* | 4/2012 | Montemerlo | G06Q 40/08 701/25 |

FOREIGN PATENT DOCUMENTS

JP   2016-224712   12/2016

* cited by examiner

*Primary Examiner* — Daryl C Pope
(74) *Attorney, Agent, or Firm* — Greenblum & Bernstein, P.L.C.

(57) ABSTRACT

A warning control device provided in a vehicle is disclosed. The warning control device includes a hardware processor to: determine whether a section in which the vehicle is travelling is a section prohibited from overtaking; determine whether the vehicle is attempting an overtaking action; and, in response to determining that the vehicle is travelling in the section prohibited from overtaking and that the vehicle is attempting the overtaking action, control a warning device connected to the warning control device to warn a driver of the vehicle when the overtaking by the vehicle is not permitted in accordance with driving rules, and control the warning device not to warn the driver when the overtaking by the vehicle is permitted in accordance with the driving rules.

15 Claims, 4 Drawing Sheets

WARNING CONTROL DEVICE, WARNING CONTROL METHOD, AND COMPUTER PROGRAM PRODUCT

CROSS-REFERENCE TO RELATED APPLICATIONS

This application is based upon and claims the benefit of priority from Japanese Patent Application No. 2019-233447, filed on Dec. 24, 2019, the entire contents of which are incorporated herein by reference.

FIELD

The present disclosure relates to a warning control device, a warning control method, and a computer program product.

BACKGROUND

There have been proposed various kinds of drive assist devices for assisting drive by drivers in vehicles. For example, the drive assist device described in Japanese Patent Application Laid-open No. 2016-224712 is configured to warn a driver by using the warning device when overtaking of the subject vehicle is detected.

In the drive assist device described above, a driver may be warned in unnecessary cases. In such a case, the warning is troublesome for the driver.

Therefore, there is a need to prevent warning in unnecessary cases.

SUMMARY

A warning control device according to an embodiment of the present disclosure is provided in a vehicle and includes a hardware processor. The hardware processor is configured to: determine whether a section in which the vehicle is travelling is a section prohibited from overtaking; determine whether the vehicle is attempting an overtaking action; and, in response to determining that the vehicle is travelling in the section prohibited from overtaking and that the vehicle is attempting the overtaking action, control a warning device connected to the warning control device to warn a driver of the vehicle when the overtaking by the vehicle is not permitted in accordance with driving rules, and control the warning device not to warn the driver when the overtaking by the vehicle is permitted in accordance with the driving rules.

A warning control method according to an embodiment of the present disclosure is implemented by a computer provided in a vehicle. The warning control method includes: determining whether a section in which the vehicle is travelling is a section prohibited from overtaking; determining whether the vehicle is attempting an overtaking action; and, in response to determining that the vehicle is travelling in the section prohibited from overtaking and that the vehicle is attempting the overtaking action, controlling a warning device connected to the warning control device to warn a driver of the vehicle when the overtaking by the vehicle is not permitted in accordance with driving rules, and controlling the warning device not to warn the driver when the overtaking by the vehicle is permitted in accordance with the driving rules.

A computer program product according to an embodiment of the present disclosure includes a non-transitory computer-readable recording medium on which an executable program is recorded. The program instructs a computer provided in a vehicle to: determine whether a section in which the vehicle is travelling is a section prohibited from overtaking; determine whether the vehicle is attempting an overtaking action; and, in response to determining that the vehicle is travelling in the section prohibited from overtaking and that the vehicle is attempting the overtaking action, control a warning device connected to the warning control device to warn a driver of the vehicle when the overtaking by the vehicle is not permitted in accordance with driving rules, and control the warning device not to warn the driver when the overtaking by the vehicle is permitted in accordance with the driving rules.

DETAILED DESCRIPTION

Embodiment

The following specifically describes an embodiment by referring to the drawings. However, the unnecessarily detailed description may be omitted. For example, the following may omit the detailed description of already well-known facts and the repeated description of substantially the same components. This avoids unnecessarily abundant description and facilitates understanding of persons skilled in the art.

Note that the enclosed drawings and the following description are provided to allow persons skilled in the art to sufficiently understand the present disclosure, and do not intend to restrict the subject matter described in the claims.

Moreover, in the following description, "driving rules" are described with a premise of Japanese traffic regulations at the time of application.

The following describes the embodiment of the disclosure with reference to FIG. 1 to FIGS. 4A and 4B.

Figure 1:
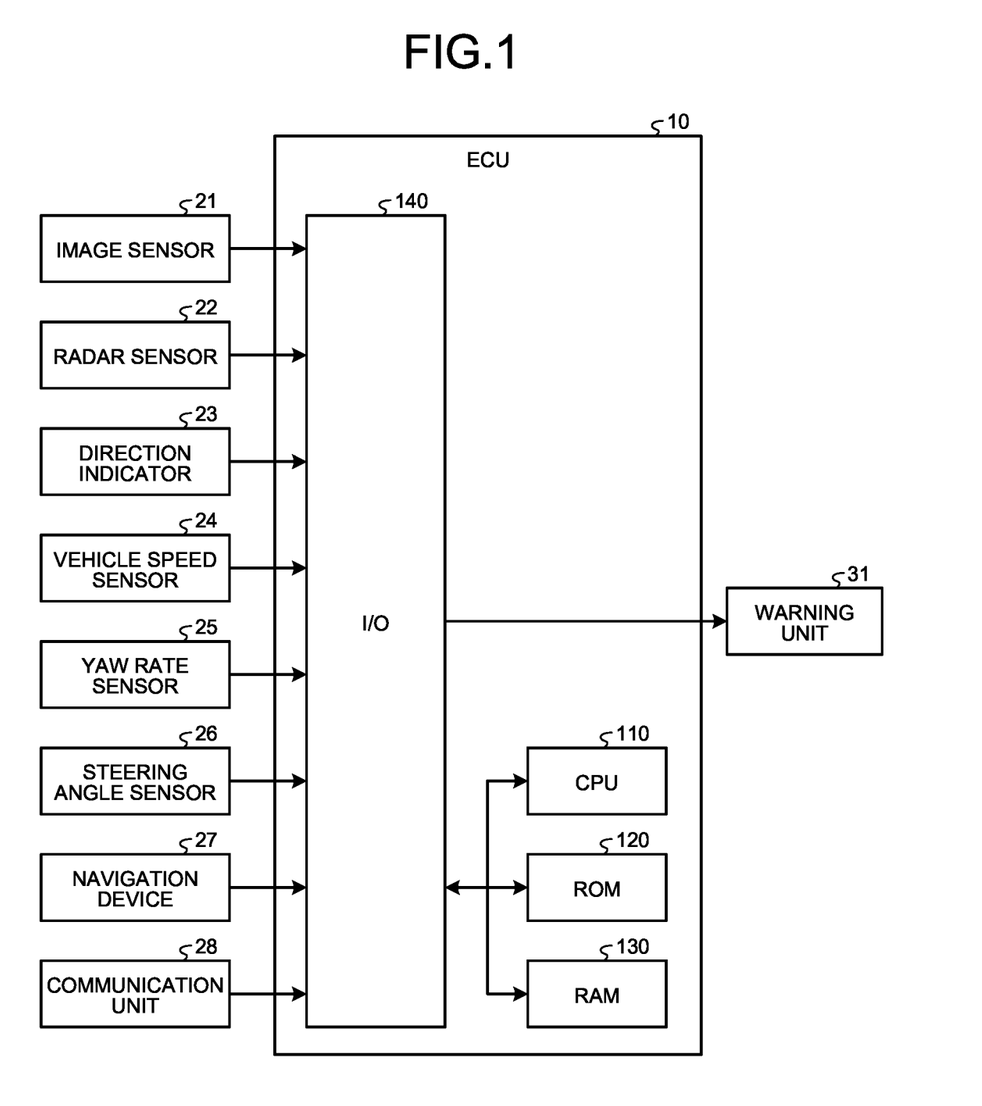
FIG. 1 is a block diagram illustrating an example of a warning system according to an embodiment.
Figure 2:
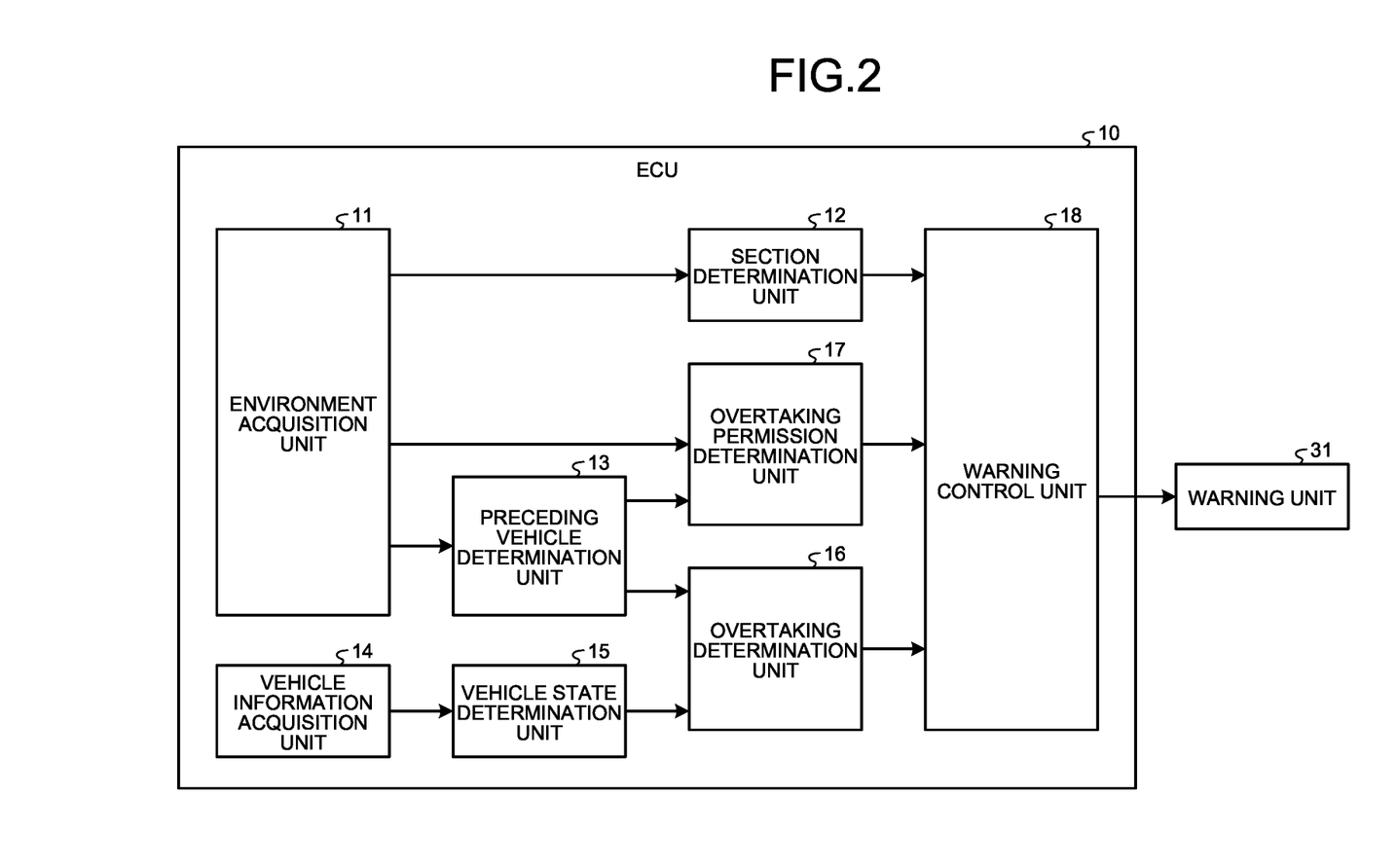
FIG. 2 is a block diagram illustrating an example of the functional configuration of the warning control device according to the embodiment.

The following describes the configuration of a warning system including a warning control device according to the embodiment with reference to FIG. 1 and FIG. 2.

FIG. 1 is a block diagram illustrating an embodiment of a warning system according to the embodiment. The warning system of the embodiment includes an image sensor 21, a radar sensor 22, a direction indicator 23, a vehicle speed sensor 24, a yaw rate sensor 25, a steering angle sensor 26, a navigation device 27, a communication unit 28, an electronic control unit (ECU) 10, and a warning unit (warning device) 31.

Note that a vehicle provided with the warning system is referred to as a subject vehicle.

Moreover, the "overtaking" in this application represents not only that the subject vehicle catches up with another vehicle travelling ahead of the subject vehicle, passes the side of that vehicle, and precedes the vehicle, but also that the subject vehicle passes the side of another vehicle stopped ahead of the subject vehicle and precedes the vehicle. In addition, the "overtaking" also represents that the subject vehicle enters a right turn lane at an intersection, and passes the side of a vehicle travelling in a straight-through lane or stopped in the straight-through lane. In this manner, the "overtaking" in this application broadly represents that, when another vehicle exists in the same line as the lane where the subject vehicle is travelling, the subject vehicle passes the side of that vehicle and proceeds the vehicle. Then, the "overtaking" represents such kinds of overtaking.

In FIG. 1, the image sensor 21, the radar sensor 22, the direction indicator 23, the vehicle speed sensor 24, the yaw rate sensor 25, the steering angle sensor 26, the navigation device 27, and the communication unit 28 are connected to the ECU 10 that is a warning control device. Each of these components inputs detection signals and various information to the ECU 10.

The image sensor 21 is an in-vehicle camera and comprises a charge-coupled device (CCD) camera, a complementary metal-oxide-semiconductor (CMOS) image sensor, a near infrared camera, and the like. The image sensor 21 captures images of surrounding environments including travelling roads of the subject vehicle, generates image data representing the captured images, and successively outputs the image data to the ECU 10. The image sensor 21 is provided around the upper end of the front glass of the subject vehicle, for example, and captures an image of an area expanding with a given angle toward the front side of the subject vehicle. Note that the image sensor 21 may be a monocular camera or a stereo camera.

The radar sensor 22 is a device that transmits electromagnetic waves as transmission waves and receives reflected waves so as to detect an object. The radar sensor 22 comprises a millimeter wave radar or a laser radar, for example. The radar sensor 22 is attached on the front part of the subject vehicle, and scans, with radar signals, an area expanding over a range with a given angle toward the front side of the subject vehicle with an optical axis as a center. Then, the radar sensor 22 generates measurement data on the basis of time from the transmission of electromagnetic waves toward the front side of the subject vehicle to the reception of reflected waves, and successively outputs the measurement data to the ECU 10. Such measurement data contains information related to a direction where an object exists, a distance to the object, and a relative speed.

The direction indicator 23 is a device that displays a travelling direction of the subject vehicle to the outside of the vehicle. The direction indicator 23 includes an operation lever operated by the driver in either the left indication position, the neutral position, or the right indication position, and outputs turn signals to the ECU 10. The turn signals are operation signals corresponding to the position of the operation lever.

The vehicle speed sensor 24 is provided on a rotation axis conveying power to the wheels of the subject vehicle, and outputs detection signals in accordance with a vehicle speed. The yaw rate sensor 25 includes a vibrator such as tuning fork, for example, and detects distortion generated in the vibrator on the basis of yaw moment of the subject vehicle so as to detect a yaw rate of the subject vehicle. The steering angle sensor 26 detects an operation angle, that is, a steering angle of the handle of the subject vehicle. These sensors 24 to 26 detect a travelling state, that is, a behavior of the subject vehicle. The sensors 24 to 26 supply the detected travelling state and the like of the subject vehicle to the ECU 10.

The navigation device 27 acquires map information containing information representing the terrain, road shapes, and the like in coordinates of the absolute coordinate system. The map information acquired by the navigation device 27 may be stored in a map information storage medium provided in the subject vehicle, or obtained by communication with an external device. In the case of the embodiment, the navigation device 27 acquires a route from a current position to a destination. The navigation device 27 outputs map information and route information to the ECU 10. Moreover, the navigation device 27 may display, as images, such information on a car navigation system, a head-up display, and the like.

For example, when it is detected that the subject vehicle has approached, with a predetermined distance, to an intersection where the subject vehicle is to turn right or left, the navigation device 27 outputs information representing such a situation and information on the direction to which the subject vehicle turns right or left, and the like to the ECU 10.

Moreover, the navigation device 27 acquires pieces of information on accidents and the like on a route to a destination. For example, the navigation device 27 acquires pieces of traffic information about accidents, faulty vehicles, road obstacles, construction, work, and the like, which can be acquired from a transportation system such as Vehicle Information and Communication System (VICS) in Japan. The navigation device 27 outputs such traffic information and the like to the ECU 10.

The communication unit 28 communicates with a communication unit provided in a vehicle other than the subject vehicle. The communication unit 28 comprises a beacon and the like. The communication unit 28 may be provided around the sheet, for example, or at another position as long as the position allows favorable communication. The communication unit 28 includes a reception unit that receives vehicle information from other vehicles and a transmission unit that transmits vehicle information on the subject vehicle (subject vehicle information). The vehicle information received at the reception unit of the communication unit 28 is transmitted to the ECU 10, while the subject vehicle information acquired at the ECU 10 is transmitted through the transmission unit. Here, the vehicle information contains vehicle identification information, vehicle position information, and the like. The identification information is a vehicle-specific ID, and the position information is coordinates indicating a current position of the vehicle. In addition, the vehicle information contains a vehicle speed and the like.

The ECU 10 is a computer including a central processing unit (CPU) 110 as a hardware processor, a read only memory (ROM) 120, a random access memory (RAM) 130, an input/output port (I/O) 140, and the like.

The image sensor 21, the radar sensor 22, the direction indicator 23, the vehicle speed sensor 24, the yaw rate sensor 25, the steering angle sensor 26, the navigation device 27, and the communication unit 28 are connected to the I/O 140 of the ECU 10. Each of these components input detection signals and various kinds of information to the I/O 140. The I/O 140 outputs the input detection signals and various kinds of information to the CPU 110 and the RAM 130. Moreover, the I/O 140 outputs control signals and the like output from the CPU 110 to the warning unit 31.

In the ECU 10, the CPU 110 executes a computer program installed in the ROM 120 to control the warning action by the warning unit 31 to a driver. The computer program may be preliminarily recorded in the ROM 120 of the ECU 10. Alternatively, the computer program may be provided, as a computer program product, through an electric communications line such as the Internet, or provided, as a computer program product, by being recorded in a non-transitory computer-readable recording medium such as a disc or recorded in a recording medium such as a memory card.

FIG. 2 is a block diagram illustrating an example of a functional configuration of the warning control device according to the embodiment. The ECU 10 includes, as the functional configuration, an environment acquisition unit 11, a section determination unit 12, a preceding vehicle determination unit 13, a vehicle information acquisition unit 14, a vehicle state determination unit 15, an overtaking determination unit 16, an overtaking permission determination unit 17, and a warning control unit 18.

The environment acquisition unit 11 acquires the surrounding state of the subject vehicle. To be more specific, the environment acquisition unit 11 acquires the surrounding state of the subject vehicle on the basis of information supplied from the image sensor 21, the radar sensor 22, and the like provided in the subject vehicle. The surrounding state of the subject vehicle acquired by the environment acquisition unit 11 includes the presence or absence of a vehicle other than the subject vehicle, a position, a moving direction, a relative speed to the subject vehicle, and attributes of such a vehicle, and the like. Moreover, in a case where the navigation device 27 acquires pieces of traffic information about an accident and the like provided by the transportation system such as the VICS in Japan, the environment acquisition unit 11 acquires pieces of information on an accident and the like in the route to the destination, on the basis of information supplied from the navigation device 27. Furthermore, when the vehicle-to-vehicle communication is possible with a vehicle other than the subject vehicle, the environment acquisition unit 11 acquires vehicle information on that vehicle through the communication unit 28. The environment acquisition unit 11 supplies the acquired information related to the surrounding state of the subject vehicle to the section determination unit 12, the preceding vehicle determination unit 13, and the overtaking permission determination unit 17.

The section determination unit 12 determines whether the section in which the subject vehicle is travelling is a section prohibited from overtaking (hereinafter, an "overtaking prohibited section"), on the basis of information acquired by the environment acquisition unit 11. The overtaking prohibited section refers to a section defined by driving rules that are rules for driving vehicles defined in each country. For example, the overtaking prohibited section includes a place where the overtaking is prohibited by signs, the vicinity of corners of a road, an intersection, and an area within 30 m from the intersection, and the like. For example, the section determination unit 12 determines whether the subject vehicle is travelling in the overtaking prohibited section, on the basis of image data of road signs, intersections, and the like that are captured by the image sensor 21. Note that the section determination unit 12 may determine whether the subject vehicle is travelling in the overtaking prohibited section, on the basis of information on overtaking prohibited sections acquired by the navigation device 27. The section determination unit 12 outputs the determination result to the warning control unit 18.

The preceding vehicle determination unit 13 determines the presence or absence of a preceding vehicle to be overtaken, on the basis of information supplied from the environment acquisition unit 11. To be more specific, the preceding vehicle determination unit 13 determines the presence or absence of a preceding vehicle, a position, a moving direction, attributes, and a relative speed of the preceding vehicle to the subject vehicle, and a distance between the preceding vehicle and the subject vehicle. Then, when the speed of the subject vehicle is a given speed (30 km/h, for example) or higher, the distance between the preceding vehicle and the subject vehicle is a given distance (70 m, for example) or shorter, and the relative speed of the subject vehicle to the preceding vehicle is within a given range, the preceding vehicle determination unit 13 makes a determination that the preceding vehicle to be overtaken exists. The preceding vehicle determination unit 13 outputs the determination result to the overtaking determination unit 16 and the overtaking permission determination unit 17.

The vehicle information acquisition unit 14 acquires pieces of vehicle information representing various states of the subject vehicle from the direction indicator 23, the vehicle speed sensor 24, the yaw rate sensor 25, the steering angle sensor 26, the navigation device 27, and the like that are provided in the subject vehicle. To be more specific, the vehicle information acquisition unit 14 acquires operation signals related to lane change from the direction indicator 23, signals related to the vehicle speed of the subject vehicle from the vehicle speed sensor 24, signals related to the yaw angle and steering angle from the yaw rate sensor 25 and the steering angle sensor 26, respectively, and the information related to a current position of the subject vehicle from the navigation device 27. The vehicle information acquisition unit 14 supplies the acquired vehicle information to the vehicle state determination unit 15.

The vehicle state determination unit 15 determines the state of the subject vehicle on the basis of vehicle information acquired by the vehicle information acquisition unit 14. The determination of the state of the subject vehicle includes determination of the presence or absence of an initial action of overtaking. To be more specific, the vehicle state determination unit 15 determines whether a turn signal by the direction indicator 23 has occurred. When it is determined that the turn signal has occurred, the vehicle state determination unit 15 makes a determination that the initial action of overtaking has occurred. The vehicle state determination unit 15 supplies the determination result to the overtaking determination unit 16.

The overtaking determination unit 16 determines whether the subject vehicle is attempting an overtaking action. The overtaking action refers to an action allowing the subject vehicle to overtake the preceding vehicle. To be more specific, when the subject vehicle is attempting to change the lane and a preceding vehicle to be overtaken exists, on the basis of information supplied and acquired by the preceding vehicle determination unit 13 and the vehicle state determination unit 15, the overtaking determination unit 16 makes a determination that the subject vehicle is attempting an overtaking action. The overtaking determination unit 16 outputs the determination result to the warning control unit 18.

The overtaking permission determination unit 17 determines whether the overtaking of the subject vehicle is currently permitted in accordance with the driving rules, on the basis of information supplied from the environment acquisition unit 11 and the preceding vehicle determination unit 13. In the section determined to be an overtaking prohibited section by the section determination unit 12, the overtaking is prohibited in principle. However, when given conditions are satisfied, the overtaking permission determination unit 17 makes a determination that the overtaking is permitted in accordance with the driving rules. The details of this determination will be described later. The overtaking permission determination unit 17 outputs the determination result to the warning control unit 18.

The warning control unit 18 controls the warning unit (warning device) 31 described later. To be more specific, when the section determination unit 12 determines that the subject vehicle is travelling in the overtaking prohibited section and the overtaking determination unit 16 determines that the subject vehicle is attempting an overtaking action, the warning control unit 18 controls the warning unit 31 to warn a driver of the fact of overtaking in the overtaking prohibited section. On the other hand, even when the section determination unit 12 determines that the subject vehicle is travelling in the overtaking prohibited section and the overtaking determination unit 16 determines that the subject vehicle is attempting an overtaking action, the warning control unit 18 controls the warning unit 31 not to warn a driver of the fact of overtaking in the overtaking prohibited section in a case where the overtaking permission determination unit 17 determines that the overtaking of the subject vehicle is permitted in accordance with the driving rules.

The warning unit (warning device) 31 is connected to the warning control unit 18. The warning unit 31 notifies a driver of, for example, the dangerous situation has occurred on the subject vehicle or some dangerous actions have been performed. The warning unit 31 includes one or more of the sound output means such as a speaker, an alarm, and a bell, the display means such as a display, an instrument panel, and a car navigation system, the light emitting means such as a light emitting diode (LED) and a lamp, the vibrating means such as a vibrator provided at a steering wheel, an acceleration pedal, a brake pedal, a seat, a head rest, a seat belt, or the like, and the means for giving reaction force to the driving operation by the above-described means. When warning a driver, the warning control unit 18 controls at least one of the sound output means of the warning unit 31 described above. Note that the warning control unit 18 may perform the warning by linking two or more of the sound output means of the warning unit 31. For example, the warning control unit 18 may control the steering wheel to vibrate while controlling the speaker to output a sound.

Figure 3:
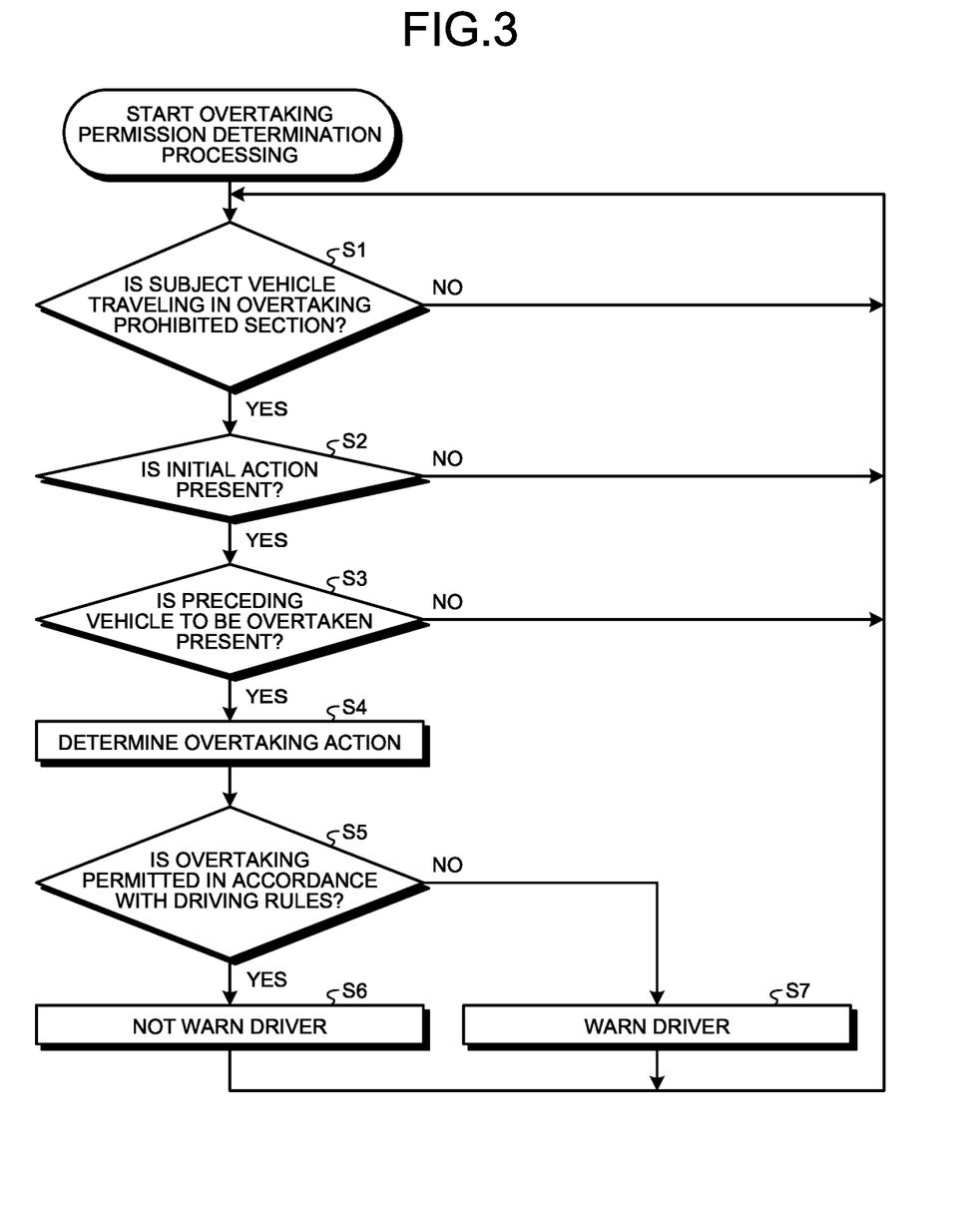
FIG. 3 is a flowchart for explaining overtaking permission determination processing performed by the warning system.

The following describes the overtaking permission determination processing performed by the ECU 10 with reference to a flowchart in FIG. 3. FIG. 3 is a flowchart for describing overtaking permission determination processing performed by the warning system. This processing is repeatedly performed by the ECU 10 in a predetermined cycle.

At Step S1, the section determination unit 12 determines whether the subject vehicle is travelling in a section prohibited from overtaking (the overtaking prohibited section). In the case of Yes at Step S1, the section determination unit 12 outputs, to the warning control unit 18, the fact that the subject vehicle is travelling in the overtaking prohibited section, and the processing advances to Step S2.

At Step S2, the vehicle state determination unit 15 determines the presence or absence of an initial action of overtaking. In the case of Yes at Step S2, the vehicle state determination unit 15 outputs, to the overtaking determination unit 16, the fact that the initial action of overtaking has occurred, and the processing advances to Step S3.

At Step S3, the preceding vehicle determination unit 13 determines the presence or absence of a preceding vehicle to be overtaken. In the case of Yes at S3, the preceding vehicle determination unit 13 outputs, to the overtaking determination unit 16 and the overtaking permission determination unit 17, the fact that a preceding vehicle to be overtaken exists, and the processing advances to Step S4.

At Step S4, the overtaking determination unit 16 makes a determination that the subject vehicle is attempting an overtaking action, in response to receiving the determination results at Step S2 and Step S3, which represent that the subject vehicle is attempting to change the lane and a preceding vehicle to be overtaken exists. Then, the overtaking determination unit 16 outputs, to the warning control unit 18, the fact that the subject vehicle is attempting an overtaking action, and the processing advances to Step S5.

At Step S5, the overtaking permission determination unit 17 determines whether the overtaking is permitted in accordance with the driving rules. The following specifically describes some methods of determining that the overtaking is permitted in accordance with the driving rules, with reference to FIGS. 4A and 4B. Here, M in the drawings represents the subject vehicle, and P represents a preceding vehicle. The lane on which the subject vehicle is travelling is referred to as a travelling lane L1.

Figure 4A:
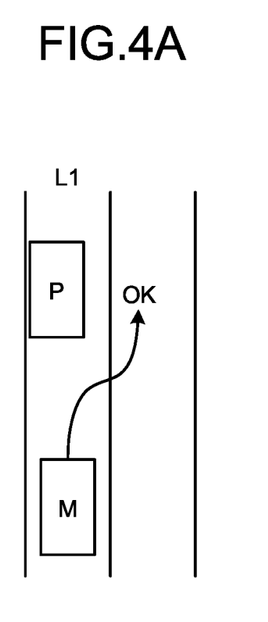
FIGS. 4A and 4B are each a diagram illustrating an example of a state where the overtaking is permitted.

As illustrated in FIG. 4A, in the overtaking prohibited section, when the subject vehicle M starts the initial action of overtaking the preceding vehicle P that is stopped ahead of the subject vehicle M on the travelling lane L1, the overtaking permission determination unit 17 makes a determination that the overtaking is permitted in accordance with the driving rules. The determination that the preceding vehicle P is stopped is made by recognition that the speed of the preceding vehicle P is zero on the basis of the data of the relative speed of the preceding vehicle P to the subject vehicle M measured by the radar sensor 22. Alternatively, the recognition that the speed of the preceding vehicle P is zero may be made on the basis of image data of the preceding vehicle P captured by the image sensor 21, or may be made on the basis of data of the speed of the preceding vehicle P received by the communication unit 28 through vehicle-to-vehicle communication.

Moreover, in the state illustrated in FIG. 4A where the preceding vehicle P stopped by an accident exists or the preceding vehicle P as a construction vehicle stopped for road construction exists in the overtaking prohibited section, the determination that the preceding vehicle P is stopped may be made on the basis of the traffic information related to accidents, constructions, and the like acquired by the navigation device 27 from the transportation system such as the VICS in Japan. Alternatively, such determination may be made by recognition of a triangular display panel, a smoke candle, a sign on the basis of image data captured by the image sensor 21.

Figure 4B:
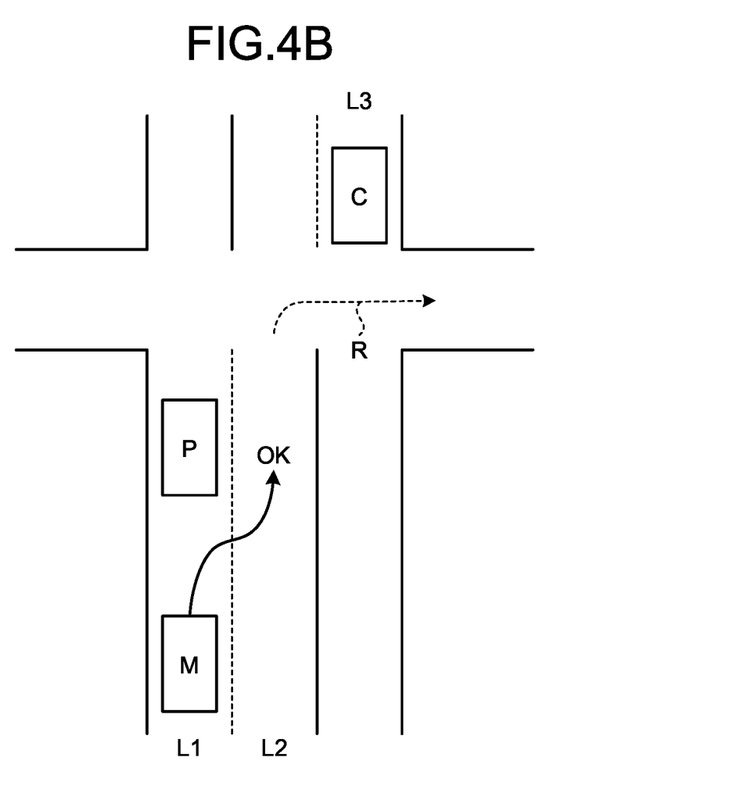

FIG. 4B is a diagram illustrating the state where the subject vehicle M is to enter the intersection. Here, a right turn lane L2 is a lane adjacent to the travelling lane L1 in which the subject vehicle M is travelling. The right turn lane L2 allows vehicles including the subject vehicle M to turn right. An opposite lane L3 is a lane opposed to the travelling lane L1. The opposite lane L3 allows an opposing vehicle C to travel straight.

In the state illustrated in FIG. 4B, at the intersection that is an example of the overtaking prohibited section, the subject vehicle M is attempting to change the lane from the travelling lane L1 being a straight-through lane to the right turn lane L2 in order to turn right by crossing the opposite lane L3 along a route R illustrated by a broken arrow. This may be a state where the subject vehicle M is attempting to overtake the preceding vehicle P existing in the original lane L1 (straight-through lane). In this case, the overtaking permission determination unit 17 makes a determination that the overtaking of the subject vehicle M is permitted in accordance with the driving rules. Here, the determination that the vehicle is entering the right turn lane is made on the basis of image data of the intersection captured by the image sensor 21. Such determination may be made on the basis of map data stored or acquired by the navigation device 27.

In FIG. 4B, there has been described the case in which the subject vehicle M travelling on the left side turns right at the intersection. The above-described determination method may be also applied to the case in which the subject vehicle M travelling on the right side turns left at an intersection. That is, regardless of whether the subject vehicle is travelling on the left side or right side, when the subject vehicle M is attempting to overtake the preceding vehicle P existing on the original travelling lane L1 by changing the lane from the travelling lane L1 (straight-through lane) to the right turn/left turn lane L2 in order to cross the opposing lane L3 and turn right/left at the intersection, the overtaking permission determination unit 17 makes the determination that the overtaking of the subject vehicle M is permitted in accordance with the driving rules.

Note that the above-described methods of determining that the overtaking is permitted in accordance with the driving rules are mere examples. It is also possible to determine whether the overtaking is permitted in accordance with the driving rules by using part of the above-described information, other information, or another method. For example, the determination may be made by using a road width or a position of a preceding vehicle on a travelling lane. For example, when the road on which the subject vehicle is travelling is relatively wide, or when a preceding vehicle is close to the end of the road, and when it is determined that the subject vehicle is able to overtake the preceding vehicle without deviating from the lane, it is possible to make the determination that the overtaking is permitted in accordance with the driving rules. In the case of Yes at Step S5 in FIG. 3, the overtaking permission determination unit 17 outputs, to the warning control unit 18, the fact that the overtaking is permitted in accordance with the driving rules, and the processing advances to Step S6.

At Step S6, the warning control unit 18 controls the warning unit 31 not to warn the driver. Moreover, as in this case, when the warning control unit 18 controls the warning unit 31 not to warn the driver even though it is determined that the subject vehicle is attempting an overtaking action in the overtaking prohibited section, the warning control unit 18 may control the warning unit 31 to call driver's attention. Here, to call driver's attention represents a notification given to the driver more moderately than in the case of warning. For example, in the case of warning by sound, attention is called by outputting smaller sound than in the case of warning. Alternatively, attention is called, without sound, by displaying the fact that the subject vehicle is attempting an overtaking action in the overtaking prohibited section on a display or the like.

In the case of No at Step S5, the overtaking permission determination unit 17 outputs, to the warning control unit 18, the fact that the overtaking is not permitted in accordance with the driving rules, and the processing advances to Step S7.

At Step S7, the warning control unit 18 warns, by the warning unit 31, the driver of the fact that the subject vehicle is attempting an overtaking action in the overtaking prohibited section.

After Step S6 or Step S7, the processing returns to Step S1, and the processing following Step S1 is performed.

When the section determination unit 12 determines that the subject vehicle is not travelling in the overtaking prohibited section (No at Step S1), the fact that the subject vehicle is not travelling in the overtaking prohibited section is output to the warning control unit 18. Then, the processing of Step S1 is performed again, and the processing following Step S1 is performed.

Moreover, when the vehicle state determination unit 15 determines that the turn signal of the subject vehicle has not occurred (No at Step S2), the fact that the turn signal of the subject vehicle has not occurred is output to the overtaking determination unit 16. Then, the processing returns to Step S1, and the processing following Step S1 is performed.

Furthermore, when the preceding vehicle determination unit 13 determines that a preceding vehicle to be overtaken does not exist (No at Step S3), the fact that a preceding vehicle to be overtaken does not exist is output to the overtaking determination unit 16. Then, the processing returns to Step S1, and the processing following Step S1 is performed.

In the above-described embodiment, the presence or absence of the initial action of overtaking is determined based on whether the turn signal has occurred. Alternatively, or in addition to this, it may be determined on the basis of the change of a steering angle or the change of yaw signals. Moreover, the order of the steps in the flowchart of FIG. 3 is not limited to the above-described order.

In addition, the above-described embodiment has been described with the premise of the Japanese traffic regulations at the time of application. Even when the traffic regulations and the like are changed depending on the age and country, various changes may be made on the basis of the technical ideas of the present invention so as to adapt thereto.

Furthermore, the embodiment of the present disclosure is not limited to the above-described embodiment, and may be modified variously in a range not departing from the gist of the present disclosure.

Outline

As is clear from the above-described embodiment, the present disclosure includes the following aspects. In the following, the reference symbols are represented with parentheses only to clarify the correspondence with the embodiment.

The warning control device (10) of the first aspect is a warning control device provided in a vehicle, and includes the section determination unit (12), the overtaking determination unit (16), and the warning control unit (18). The section determination unit (12) is configured to determine whether the section in which the vehicle is travelling is a section prohibited from over taking (an overtaking prohibited section). The overtaking determination unit (16) is configured to determine whether the vehicle is attempting an overtaking action. The warning control unit (18) is configured to control the warning unit (31) warning a driver. When the section determination unit (12) determines that the vehicle is travelling in the overtaking prohibited section and the overtaking determination unit (16) determines that the vehicle is attempting an overtaking action, the warning control unit (18) controls the warning unit (31) to warn the driver when the overtaking by the vehicle is not permitted in accordance with the driving rules, and controls the warning unit (31) not to warn the driver when the overtaking by the vehicle is permitted in accordance with the driving rules. According to the first aspect, it is possible to prevent warning in unnecessary cases. Therefore, it is possible to prevent bothering feeling caused by warning when the overtaking by the subject vehicle is permitted in accordance with the driving rules.

The warning control device (10) of the second aspect may be implemented in combination with the first aspect. In the second aspect, the warning control device (10) further includes the environment acquisition unit (11) configured to acquire the surrounding state of the vehicle travelling, and the overtaking permission determination unit (17) configured to determine whether the overtaking by the vehicle is permitted in accordance with the driving rules, on the basis of surrounding state acquired by the environment acquisition unit (11), and outputs the determination result to the warning control unit (18). According to the second aspect, it is possible to improve the accuracy of the determination on whether the overtaking is permitted.

The warning control device (10) of the third aspect may be implemented in combination with the second aspect. In the third aspect, the warning control device (10) further includes the preceding vehicle determination unit (13) configured to determine the state of a preceding vehicle travelling ahead of the vehicle. The overtaking permission determination unit (17) determines whether the overtaking by the vehicle is permitted, on the basis of the state of the preceding vehicle determined by the preceding vehicle determination unit (13). According to the third aspect, it is possible to improve the accuracy of the determination on whether the overtaking is permitted.

The warning control device (10) of the fourth aspect may be implemented in combination with the third aspect. In the fourth aspect, the preceding vehicle determination unit (13) determines whether the preceding vehicle is stopped. The overtaking permission determination unit (17) determines that the overtaking by the vehicle is permitted when the preceding vehicle determination unit (13) determines that the preceding vehicle is stopped. According to the fourth aspect, it is possible to improve the accuracy of the determination on whether the overtaking is permitted.

The warning control device (10) of the fifth aspect may be implemented in combination with the fourth aspect. In the fifth aspect, the preceding vehicle determination unit (13) makes the determination that the preceding vehicle is stopped when the speed of the preceding vehicle is zero. According to the fifth aspect, it is possible to improve the accuracy of the determination on whether the preceding vehicle is stopped.

The warning control device (10) of the sixth aspect may be implemented in combination with the fifth aspect. In the sixth aspect, the preceding vehicle determination unit (13) recognizes whether the speed of the preceding vehicle is zero or not by using the detection result from the radar sensor (22). According to the sixth aspect, it is possible to improve the accuracy of the determination on whether the preceding vehicle is stopped.

The warning control device (10) of the seventh aspect may be implemented in combination with the fifth aspect. In the seventh aspect, the preceding vehicle determination unit (13) recognizes whether the speed of the preceding vehicle is zero or not by using images captured by the image sensor (21). According to the seventh aspect, it is possible to improve the accuracy of the determination on whether the preceding vehicle is stopped.

The warning control device (10) of the eighth aspect may be implemented in combination with the fifth aspect. In the eighth aspect, the preceding vehicle determination unit (13) recognizes whether the speed of the preceding vehicle is zero or not by using the state of the preceding vehicle acquired by vehicle-to-vehicle communication with the preceding vehicle. According to the eighth aspect, it is possible to improve the accuracy of the determination on whether the preceding vehicle is stopped.

The warning control device (10) of the ninth aspect may be implemented in combination with any one of the third to the eighth aspects. In the ninth aspect, the preceding vehicle determination unit (13) determines whether the preceding vehicle is an accident vehicle. The overtaking permission determination unit (17) make the determination that the overtaking by the vehicle is permitted when the preceding vehicle determination unit (13) determines that the preceding vehicle is an accident vehicle. According to the ninth aspect, it is possible to improve the accuracy of the determination on whether the overtaking is permitted.

The warning control device (10) of the tenth aspect may be implemented in combination with the ninth aspect. In the tenth aspect, the preceding vehicle determination unit (13) perform the determination on whether the preceding vehicle is the accident vehicle by using traffic information acquired from a transportation system, such as the VICS in Japan, and the position information about the vehicle. According to the tenth aspect, it is possible to improve the accuracy of the determination on whether the preceding vehicle is an accident vehicle.

The warning control device (10) of the eleventh aspect may be implemented in combination with any one of the second to the tenth aspects. In the eleventh aspect, in a case where the vehicle is to pass an intersection, when the vehicle crosses an opposing lane opposed to a travelling lane in which the vehicle is travelling, and enters a right turn/left turn lane from the traveling lane to turn right or left at the intersection, the overtaking permission determination unit (17) determines that the overtaking by the vehicle is permitted. According to the eleventh aspect, it is possible to improve the accuracy of the determination on whether the overtaking is permitted.

The warning control device (10) of the twelfth aspect may be implemented in combination with any one of the first to the eleventh aspects. In the twelfth aspect, the warning control unit (18) controls the warning unit (31) to call driver's attention when controlling the warning unit (31) not to warn the driver. According to the twelfth aspect, it is possible to appropriately make a notification to the driver even in the case where the warning is not given.

The warning control method of the thirteenth aspect includes: determining whether the section in which the vehicle is travelling is a section prohibited from overtaking (overtaking prohibited section); determining whether the vehicle is attempting an overtaking action; and, in response to determining that the vehicle is travelling in the overtaking prohibited section and that the vehicle is attempting the overtaking action, controlling the warning unit to warn a driver of the vehicle when the overtaking by the vehicle is not permitted in accordance with driving rules, and controlling the warning unit not to warn the driver when the overtaking by the vehicle is permitted in accordance with the driving rules. According to the thirteenth aspect, it is possible to prevent warning in unnecessary cases.

The computer program product of the fourteenth aspect includes a non-transitory computer-readable recording medium on which an executable program is recorded. The program instructs a computer provided in a vehicle to perform the method of the thirteenth aspect. According to the fourteenth aspect, it is possible to prevent warning in unnecessary cases.

The present disclosure is possible bring the advantage of preventing warning in unnecessary cases.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A warning control device provided in a vehicle, the warning control device comprising:
a hardware processor configured to:
determine whether a section in which the vehicle is travelling is a section prohibited from overtaking;
determine whether the vehicle is attempting an overtaking action; and
in response to determining that the vehicle is travelling in the section prohibited from overtaking and that the vehicle is attempting the overtaking action,
control a warning device connected to the warning control device to warn a driver of the vehicle when the overtaking by the vehicle is not permitted in accordance with driving rules, and
control the warning device not to warn the driver when the overtaking by the vehicle is permitted in accordance with the driving rules,
wherein the overtaking includes, when a preceding vehicle exists in a same lane in which the vehicle is travelling, the vehicle passing on a side of the preceding vehicle and proceeding the preceding vehicle.

2. The warning control device according to claim 1, wherein the hardware processor is configured to
acquire a surrounding state of the vehicle travelling, and
determine, as a determination based on the surrounding state, whether the overtaking by the vehicle is permitted in accordance with the driving rules and apply a result of the determination to the control on the warning device.

3. The warning control device according to claim 2, wherein the hardware processor is configured to
determine a state of the preceding vehicle travelling ahead of the vehicle, and
perform, based on the state of the preceding vehicle, the determination on whether the overtaking by the vehicle is permitted.

4. The warning control device according to claim 3, wherein the hardware processor is configured to
determine whether the preceding vehicle is stopped, and
make the determination that the overtaking by the vehicle is permitted in response to determining that the preceding vehicle is stopped.

5. The warning control device according to claim 4, wherein the hardware processor is configured to determine that the preceding vehicle is stopped when a speed of the preceding vehicle is zero.

6. The warning control device according to claim 5, wherein the hardware processor is configured to recognize whether the speed of the preceding vehicle is zero or not by using a detection result of a radar sensor connected to the warning control device.

7. The warning control device according to claim 5, wherein the hardware processor is configured to recognize whether the speed of the preceding vehicle is zero or not by using images captured by an image sensor connected to the warning control device.

8. The warning control device according to claim 5, wherein the hardware processor is configured to recognize whether the speed of the preceding vehicle is zero or not by using a state of the preceding vehicle acquired by vehicle-to-vehicle communication with the preceding vehicle.

9. The warning control device according to claim 3, wherein the hardware processor is configured to
determine whether the preceding vehicle is an accident vehicle, and
make the determination that the overtaking by the vehicle is permitted in response to determining that the preceding vehicle is the accident vehicle.

10. The warning control device according to claim 9, wherein the hardware processor is configured to determine whether the preceding vehicle is the accident vehicle by using traffic information acquired from a transportation system and position information about the vehicle.

11. The warning control device according to claim 2, wherein the hardware processor is configured to make the determination that the overtaking by the vehicle is permitted in a case where
the vehicle is to pass an intersection, and
the vehicle is to cross an opposing lane opposed to the same lane in which the vehicle is travelling and to enter a right turn/left turn lane from the same lane to turn right or left at the intersection.

12. The warning control device according to claim 1, wherein the hardware processor is configured to control the warning device to call attention to the driver when controlling the warning device not to warn the driver.

13. A warning control method implemented by a computer provided in a vehicle, the warning control method comprising:
determining whether a section in which the vehicle is travelling is a section prohibited from overtaking;
determining whether the vehicle is attempting an overtaking action; and
in response to determining that the vehicle is travelling in the section prohibited from overtaking and that the vehicle is attempting the overtaking action,
controlling a warning device connected to the warning control device to warn a driver of the vehicle when the overtaking by the vehicle is not permitted in accordance with driving rules, and
controlling the warning device not to warn the driver when the overtaking by the vehicle is permitted in accordance with the driving rules,
wherein the overtaking includes, when a preceding vehicle exists in a same lane in which the vehicle is travelling, the vehicle passing on a side of the preceding vehicle and proceeding the preceding vehicle.

14. A non-transitory computer-readable recording medium on which an executable program is recorded, the executable program instructing a computer provided in a vehicle to:
determine whether a section in which the vehicle is travelling is a section prohibited from overtaking;
determine whether the vehicle is attempting an overtaking action; and
in response to determining that the vehicle is travelling in the section prohibited from overtaking and that the vehicle is attempting the overtaking action,
control a warning device connected to the warning control device to warn a driver of the vehicle when the overtaking by the vehicle is not permitted in accordance with driving rules, and
control the warning device not to warn the driver when the overtaking by the vehicle is permitted in accordance with the driving rules, wherein the overtaking includes, when a preceding vehicle exists in a same lane in which the vehicle is travelling, the vehicle passing on a side of the preceding vehicle and proceeding the preceding vehicle.

15. The warning control device according to claim 1, wherein the hardware processor is configured to
   determine that an initial action of the overtaking action has occurred,
   control, after the initial action of the overtaking action has occurred, the warning device connected to the warning control device to warn the driver of the vehicle when the overtaking by the vehicle is not permitted in accordance with driving rules, and
   control, after the initial action of the overtaking action has occurred, the warning device not to warn the driver when the overtaking by the vehicle is permitted in accordance with the driving rules.

* * * * *